United States Patent [19]
Bauer et al.

[11] Patent Number: 4,718,154
[45] Date of Patent: Jan. 12, 1988

[54] PLASTIC EXTRUSION-TRANSPORT ROLLER FOR PHOTOMECHANICAL APPARATUS

[75] Inventors: Walter Bauer; Heinrich Färber, both of Munich, Fed. Rep. of Germany

[73] Assignee: Agfa-Gevaert AG, Leverkusen, Fed. Rep. of Germany

[21] Appl. No.: 893,566

[22] Filed: Aug. 5, 1986

[30] Foreign Application Priority Data

Aug. 22, 1985 [DE] Fed. Rep. of Germany ....... 3530041

[51] Int. Cl.$^4$ ................................................. B21B 1/00
[52] U.S. Cl. ...................................... 29/123; 29/110; 29/129
[58] Field of Search ................. 29/123, 132, 110, 129; 164/66

[56] References Cited

U.S. PATENT DOCUMENTS

2,218,817 10/1940 Frost ..................................... 29/123
3,550,231 12/1970 Rosenkranz et al. .................. 29/123

FOREIGN PATENT DOCUMENTS

2232424 10/1977 Fed. Rep. of Germany .

Primary Examiner—Howard N. Goldberg
Assistant Examiner—Irene Graves Golabi
Attorney, Agent, or Firm—Michael J. Striker

[57] ABSTRACT

A transport roller made of plastics by extrusion and used for photomechanical apparatus for transporting film or X-ray cassettes or the like is formed as a sleeve having an internal recess, the surface of which is provided with a plurality of inwardly radially protruding ribs which ensure a stable and rigid structure of the roller without requiring a metallic core in the roller.

5 Claims, 6 Drawing Figures

PLASTIC EXTRUSION-TRANSPORT ROLLER FOR PHOTOMECHANICAL APPARATUS

BACKGROUND OF THE INVENTION

The present invention relates to a transport roller formed by extrusion of plastics and having a cylindrical peripheral surface. Such transport rollers are usually utilized in photomechanical apparatus, such as X-ray film cassette-loading and unloading devices, film development apparatus, sheet film receiving screens for image receiving screens or X-ray receiving devices or the like.

High quality, specifically high stability, has been required for rollers used in the above mentioned apparatus. To ensure stability and balance condition during operation such rollers, made as sleeves of plastics, have been provided with metallic cores whereby, upon utilization in wet processing apparatus, metallic cores of corrosion-resistant noble metals have been used and the side faces of the roller have been made fluid-sealed.

In the rollers used for transporting film sheets, for example in X-ray film-loading and unloading devices, high requirements to equilibrium conditions of the rollers must be met so that in no case rollers be curved. Rollers of this type have been disclosed in DE-PS No. 2,232,424. Such rollers can have a variety of shapes.

SUMMARY OF THE INVENTION

It is an object of the present invention to provide an impoved transport roller formed of extruded plastics.

It is another object of the invention to provide a plastic extruded transport roller which is formed with a metallic core but has high form stability and can therefore be used in the aforementioned photomechanical apparatus.

These and other objects of the invention are attained by a transport roller extruded from plastics, for use in photomechanical apparatus such as X-ray film cassette-loading and unloading devices, film development apparatus, film sheet-processing apparatus for screen image receivers, x-ray receivers or the like, the transport roller including a cylindrical sleeve with a cylindrical outer surface, a cross-section of said roller being formed as a circular ring having said cylindrical outer surface and provided with a plurality of inwardly radially extending ribs having internal curved end surfaces of the same curvature, said end surfaces altogether forming a circular internal surface of the roller for engaging a shaft of the roller received in said recess.

The circular internal surface may form a cylindrical recess extended over the length of the roller, said roller having end faces, said shaft having end portions extending outwardly from said end faces.

The roller may further include end caps applied to said end faces to close said recess, said end caps being connected to said end portions, respectively.

Each cap may have a pocket hole in which a respective end portion of said shaft is secured.

Each end cap may be welded to a respective end face of the roller.

Each cap may have at a side thereof facing a respective end face, projections, said projections corresponding in shape to spaces between said ribs and in assembly extending between said ribs and being locked therewith.

The ribs may have internal portions which form within said roller an inner cylindrical ring of a diameter smaller that that of said outer surface.

The inner cylindrical ring may have external end portions which extend outwardly from the roller at two end faces thereof and form the shaft of the roller.

Said end portions may be formed by facing or cutting of said outer surface and said ribs at both ends of the roller.

The advantage of the roller according to the invention resides in that a simple and precise part is extruded from a suitable plastic material, which part has the necessary geometry and high form stability. Various plastics, for example reinforced with carbon and glass fibers and having high rigidity and an electrostatic charge-preventing residual conductivity, can be utilized, which plastics readily meet special requirements of various photomechanical apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
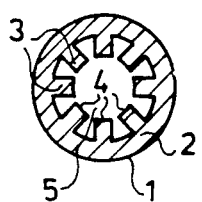
FIG. 1 is a cross-sectional view of the transport roller of the invention.
Figure 2:
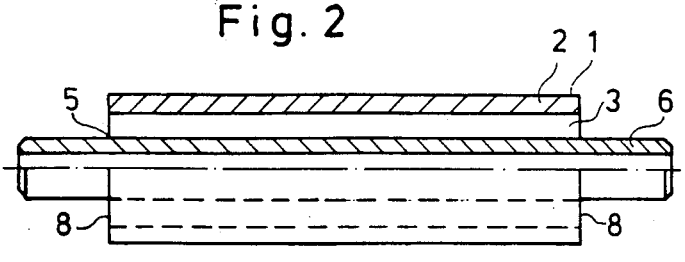
FIG. 2 is a sectional axial view of the roller of FIG. 1 with a shaft inserted therein.

Referring now to the drawings in detail, and firstly to FIGS. 1 and 2 thereof, it will be seen that a transport roller, formed of any suitable plastic by extrusion, has a sleeve 1. The sleeve is formed as a tube. Such a roller is utilized for phototechnical apparatus. Sleeve 1 is formed of a tube extruded from plastic and cut into pieces of a predetermined length which defines the length of the roller. It is expedient that the outer diameter of the sleeve 1 be somewhat greater than a desired diameter of the roller being made and then the tubular piece is faced to a desired diameter. It has been known that such rollers should be provided with a metal core for stability, whereby normally the plastic sleeve is extruded via a metal tube. According to the invention a profile for a very stable roller is obtained without a metal core so as to use a tube extruded from plastic only.

Figure 3:
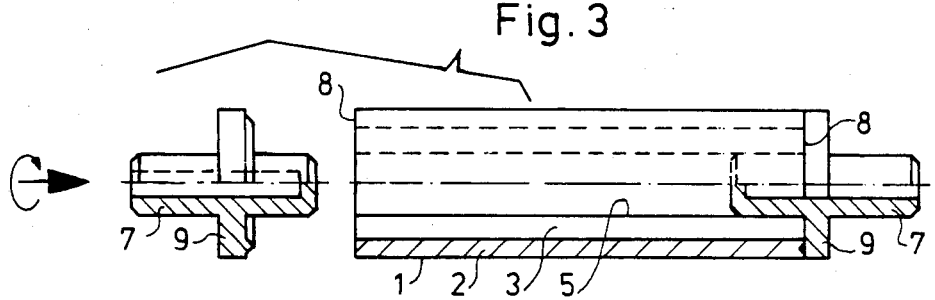
FIG. 3 is a sectional axial view of the roller of FIG. 1 with shaft portions insertable thereinto.

The roller shown in FIGS. 1-3 is cut to length from a piece of extruded plastic tube. In cross-section the sleeve 1 is formed as a circular ring 2 with a plurality of radially inwardly protruding ribs 3. These ribs are angularly equally spaced from each other at the circular ring 2 or at the inexpensively formed circular cylinder 2 of the roller. Ribs 3 extend over the entire length of the roller.

The internal ends 4 of ribs or projections 3 are formed as circular curves or cylindrical surfaces of the same curvature so that altogether all surfaces of ends 4 define inside the roller, a cylindrical hollow space 5 over the entire length of the roller. Due to such a profile of the circular ring 2, namely due to the provision of the radially inwardly projecting ribs 3 the plastic roller has, upon utilization of a suitable plastic (for extreme requirements a carbon or glass fiber-reinforced plastic can be used), such stability in the axial direction and the radial direction that commonly known and widely used up till now metallic cores can be omitted.

At the same time, due to the cylindrical pieces 4 formed on the projections or ribs 3, the bearing and radial fixation for a roller axle or shaft 3 or shaft portions 7 would be obtained without any additional treatment steps.

As shown in FIG. 3, in the roller sleeve 1, projections or ribs 3, 4 form a roller core which substitutes a metallic core, so that the roller is formed, in which the shaft or axle 6 projected outwardly from the end faces 8 of the roller extends through the axial cylindrical recess 5 constituted by end surfaces 4 of ribs 3. If roller 1 should rotate loosely the axle or shaft 6 is secured only in the axial direction in the known fashion. If, however, roller 1 should be driven by its shaft the shaft 6 must be connected to the roller sleeve for joint rotation; all known connection means can be utilized for this purpose. The shaft or axle 6 can be formed of a metallic or plastic rod. When the roller is used in wet processing apparatus a roller made completely of chemical-resistant plastics, is preferable.

The embodiment shown in FIG. 3 is particularly suitable for wet-processing apparatus. In this roller, end faces 8 of the roller are closed with cover caps 9 made of plastic so that no fluid can penetrate the space between projections 3 and the central recess or opening 5. Shaft portions 7 for the roller 1 are secured by deforming in the cover caps 9 so that each portion 7 projects into the central recess 5 and both portions 7 are centered. The caps 9 are welded to the sides of roller 1 by any suitable welding means. It is also, however, possible that metal shafts be embedded in caps 9, which shafts would not extend into recess 5, thereby no fluid would be allowed to enter the interior of the roller. It is also possible to provide, at the side of each cap 9 facing the roller, projections which would correspond to and extend into spaces between ribs 3. Such projections can then be locked with ribs 3, after the caps 9 have been applied to the end walls of the roller.

Figure 4:
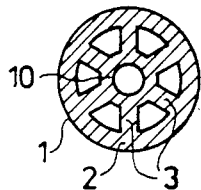
FIG. 4 is a cross-sectional view of the modified embodiment of the transport roller.
Figure 5:
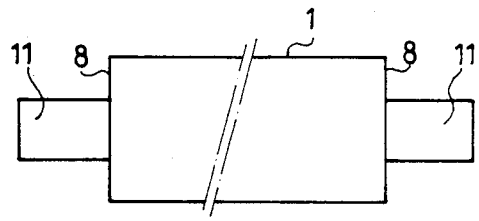
FIG. 5 a side view of the assembled roller of FIG. 4.
Figure 6:
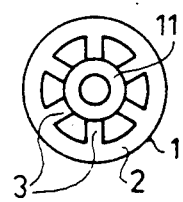
FIG. 6 is a front view of the roller of FIG. 5.

A further embodiment of the transport roller according to the invention is depicted in FIGS. 4 to 6. This embodiment is similar to that of FIG. 1, with the difference that the inner ends or surfaces of ribs 3 form a further complete cylinder 10 which not only enhances stability of the roller in the axial and radial directions but also forms the roller shaft. After the extrusion of a respective profile tube the latter is cut to pieces of predetermined length, these pieces corresponding in length to the roller having shaft portion 11. Then at both ends of such a piece the sleeve portion 1 and the ribs 3 are faced off over the predetermined length so that the pieces protruding outwardly from the end faces 8 form the shaft portions 11. A form-stable roller formed of one piece with the shaft results from the above described process.

Rollers according to the invention can be formed in a known manner as eccentrics when ribs 3 are of different length; the circular opening or recess 5 or the inner cylinder 10 is then positioned eccentrically of the roller peripheral surface.

It will be understood that each of the elements described above, or two or more together, may also find a useful application in other types of transport rollers differing from the types described above.

While the invention has been illustrated and described as embodied in a transport roller of extruded plastic, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a transport roller extruded from plastics for use in photomechanical apparatus, such as X-ray film cassette-loading and unloading devices, film development apparatus, film sheet processing apparatus for screen image receivers, X-ray receivers or the like, the transport roller including a cylindrical sleeve with a cylindrical outer surface, the improvement comprising a cross-section of said roller being formed as a circular ring having said cylindrical outer surface and being provided with a plurality of inwardly radially extending ribs having internal curved end surfaces of the same curvature, said end surfaces altogether forming a circular internal surface of the roller for engaging a shaft of the roller, said circular internal surface forming a cylindrical recess extended over the length of the roller, said roller having end faces, said shaft having end portions extending outwardly from said end faces; and end caps applied to said end faces to close said recess, said end caps being connected to said end portions, respectively, each cap having at a side thereof facing a respective end face of the roller, projections, said projections corresponding in shape to spaces between said ribs and in assembly extending between said ribs and being locked therewith.

2. The transport roller as defined in claim 1, wherein each cap has a pocket hole in which a respective end portion of said shaft is secured.

3. In a transport roller extruded from plastics for use in photomechanical apparatus, such as X-ray film cassette-loading and unloading devices, film development apparatus, film sheet processing apparatus for screen image receivers, X-ray receivers or the like, the transport roller including a shaft and a cylindrical sleeve surrounding said roller and having a cylindrical outer surface, the improvement comprising a cross-section of said roller being formed as a circular ring having said cylindrical outer surface and being provided with a plurality of inwardly radially extending ribs having internal curved end surfaces of the same curvature, said end surfaces altogether forming a circular internal surface which forms a cylindrical recess extending over the length of the roller and immediately engaging said shaft received in said recess; and end caps applied to said end faces to close said recess.

4. The transport roller as defined in claim 3, wherein each end cap is welded to a respective end face of the roller.

5. The transport roller as defined in claim 3, wherein each cap has, at a side thereof facing a respective end face of the roller, projections, said projections corresponding in shape to spaces between said ribs and in assembly extending between said ribs and being locked therewith.

* * * * *